Feb. 6, 1934.   J. A. LAFFLER   1,945,860
MEANS AND METHOD FOR RECOVERING EGG WHITES
Filed Sept. 19, 1930
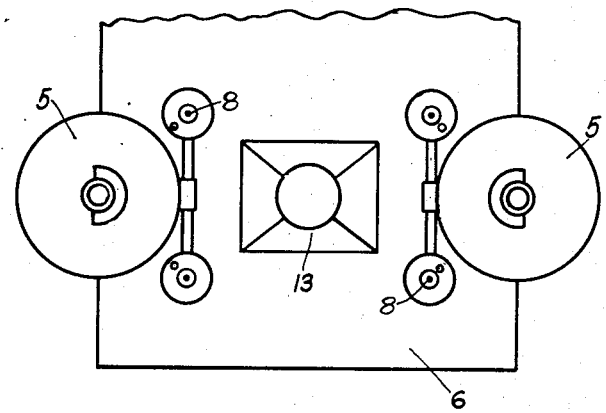
F/G. 1
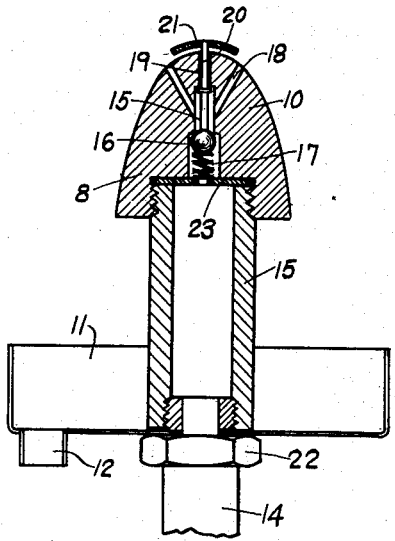
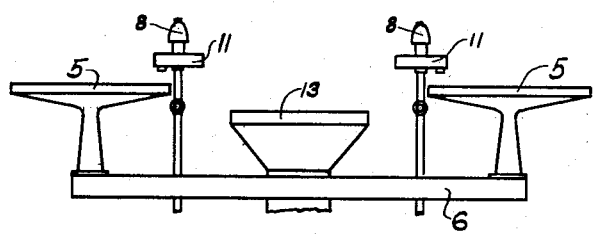
F/G. 2
F/G. 4
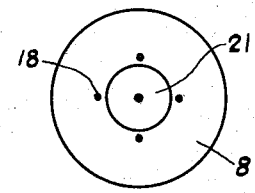
F/G. 5
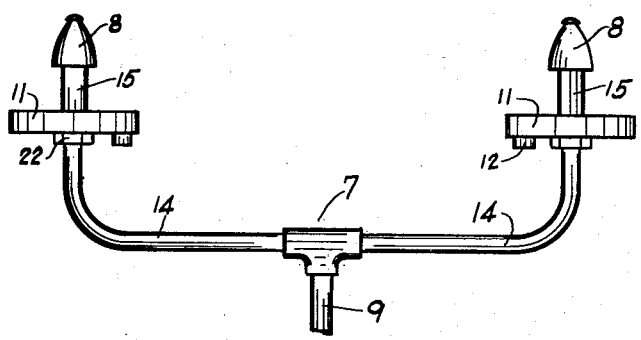
F/G. 3
INVENTOR
JAMES ASA LAFFLER
BY
*Eilers & Schaumberg*
ATTORNEYS Patented Feb. 6, 1934

1,945,860

UNITED STATES PATENT OFFICE 1,945,860

MEANS AND METHOD FOR RECOVERING EGG WHITES

James Asa Laffler, St. Louis, Mo.

Application September 19, 1930
Serial No. 483,013

6 Claims. (Cl. 146—2)

This invention relates to means and methods for recovering egg whites, and more particularly to a method and device for removing and recovering the residual white of an egg existing in the shell after a removal of the egg contents by gravity.

In certain of the larger producing centers of the world from which eggs are shipped in substantial quantities, often very great distances, the practice prevails of breaking the egg, substantially separating the contents from the shell and sealing the contents of the eggs in containers for preserving and further handling.

Under such conditions, breaking of the eggs is accomplished by manual division of the egg shell, say into two parts, the division being normally effected along a plane transverse to the longitudinal axis of the egg. The contents are delivered by gravity into receptacles and the shells vigorously shaken to remove therefrom a portion of the egg white adhering to the inside surface of the shell. Such manual removal is unsatisfactory in that there is lost, due to adhesion of the egg white to the shell, between one and five per cent of the egg content.

The present invention has for its object, stated generally, the recovery of the usually remaining adhering portion of the egg white.

More particularly stated, the invention has for its object, the provision of an improved method of recovering portions of egg white clinging or adhering to the egg shell, the method including a single simple operation requiring only a few seconds, whereby the egg content is practically completely removed from its shell.

A further object of the invention is the provision of an improved means and method involving the displacement of adhering egg white portions, from an egg shell, which consists in displacing the egg white from the shell by fluid applied under pressure.

A still further object of the invention is attained in the provision of a method and means for reducing the time heretofore necessary for completely clearing egg shells of their content, and at the same time accomplishing this operation with substantial completeness.

Further objects and advantages of the invention will appear from the following detailed description of the means and method preferably employed, and from the accompanying drawing constituting a single illustrative embodiment of the invention, and in which:

Fig. 1 is a fragmentary plan view, showing one end portion of an egg breaking table, employed according to the practice of the present invention; Fig. 2 is a side elevation of the table portion and apparatus mounted thereon, as shown in the plan view of Fig. 1; Fig. 3 is a side elevation of a nozzle stand with nozzles mounted thereon, as preferably employed in connection with the present invention, Fig. 4 is a vertical sectional elevation through one of the nozzles appearing in Fig. 3, and showing in assembled relation, a drip pan preferably employed therewith, and Fig. 5 is a plan view of the nozzle shown in Fig. 4.

The method and apparatus of the present invention are preferably employed in connection with a plurality of egg breaking and separating devices, indicated generally at 5, (Figs. 1 and 2), a plurality of which may be disposed in line along, and carried by an operating table 6. The arrangement of each device 5 is preferably such that, upon being broken, the contents of the egg are dropped into suitable receptacles.

By preference, disposed in close adjacence to each of the separating devices 5, is a nozzle stand, indicated generally at 7, the arrangement of which appears in Fig. 3. This stand may be constituted by piping, so arranged that a pair or more of the nozzles, indicated generally at 8, may be supplied from a common fluid source, such as a supply pipe 9. The nozzles 8 will be hereinafter described in greater detail, but may for the present be referred to as consisting of a semi-automatic fluid valve, structurally associated with a head portion 10 (Fig. 4), the arrangement being such that an egg shell half, inverted in position over the head portion 10, is completely relieved of its remaining contents by fluid pressure, the egg portion last removed from the shell being discharged by gravity into a cup or other suitable receptacle 11, and thence delivered through an outlet 12 into a suitable container.

Immediately upon breaking the egg and dumping its contents by gravity, the halves of the shell are inverted over the nozzles, with the above noted result, after which the egg shells are discarded, by preference, into a funnel like receiving portion 13, (Fig. 1), so disposed as to serve at least a pair of the operating stands constituted by the devices 5, 7, etc.

Proceeding now to a more detailed description of the structure of the cleaning nozzles 8, my preference is to employ compressed air, which may be supplied from any suitable receiver under a suitable pressure to the pipe 9, and thus to the several nozzles associated with each of the delivery pipes 14. My preference is to treat the compressed air, particularly for the purpose of removing at least the greatest portion of its moisture content, in order that, as will hereinafter appear, the weight of the recovered egg white is not materially increased by the added moisture through the application of water which might otherwise be added through the air applied to the shells.

The several nozzles may not only be supplied with air from the pipe 9 but, according to preference, the pipes 9 and 14 serve as supports for the nozzles. Extending from the pipe 14 for each nozzle, is a hollow stem portion 15, which may be secured, as by a threaded connection to the head portion 10. The head portion consists by preference and according to the present showing, of a substantially solid semi-ovoid element, provided with a passage 15 of stepped diameter, the largest portion being disposed nearest the stem 15, and a shoulder between the portions of different diameters, constituting a seat for a valve, indicated in the present instance, as a ball valve 16. This valve is preferably retained against its seat by a coil spring 17, and the arrangement of parts is also preferably such that the air pressure in the stem 15 tends to hold the valve 16 in closed position.

As will clearly appear from Fig. 4, the valve serves to control, in the present example, a plurality of outlets of which a pair are indicated at 18, and which are divergently and upwardly directed; the valve further controls a central passage 19 constituting a continuation of passage 15. Passage 19 serves to accommodate a stem 20, operatively connected with the valve 16. The stem 20 normally projects outwardly of the head 10 and may be provided with an exteriorly convex cap 21. Obviously, depression of the cap 21 and hence of the stem 20 and valve 16 will cause streams of air to issue from the openings 18 and 19.

It will be noted that assembly and disassembly of the parts described is facilitated through a jam nut 22, threadedly associated with the pipe 14, which, according to present preference, internally engages the lower end of the stem 15. This arrangement permits the cup 11, suitably apertured to accommodate the threaded portion of pipe 14 to be positioned, without auxiliary mounting means, between the nut 22 and the end portion of stem 15. As a means for positioning the valve assembly in the head 10, it is preferred to employ a centrally apertured disc or washer, such as 23 which may serve as a sealing member between the elements 15 and 10, and while permitting passage of air through the aperture, serves in the present instance, as an abutment for the lower end of spring 17, and hence of the remaining valve elements.

The sequence of operations and method involved in using the present apparatus is thought to be fully apparent from the preceding description. It may be noted that the partly ovoid shape of the head portion 10, and the relation of the cap 21 thereto, is such that, upon the application of an egg shell half to the nozzle head, the shell portion, upon being manually depressed into actuating engagement with the cap 21, is still substantially evenly spaced from the surface portion of the head 10, such that a relatively restricted passageway is provided for the air emitted from openings 18 and 19, so that the air necessarily flows closely to the inside surface of the shell. The air is emitted from the head openings at a substantial velocity due to the small diameter of the outlets 18 and 19, and operates with scavenging action completely to separate the egg white otherwise adhering to the inside surface of the shell. This material is forcibly ejected from between the head 10 and the superposed shell, into the pan 11, whence it is recovered as above noted.

The described step of the present process requires but a brief interval of time and effects a substantial saving in the time required for separating the contents of the egg from the shell, as compared with present methods involving manual expedients.

The present description has been directed in great detail to a single particular embodiment of a device constructed in accordance with the present invention, and the method, by preference employed in effecting the improved result as contemplated according to this disclosure. It will, however, appear obvious to those skilled in the art that various changes may be made in the structure employed, as well as in the various steps of the method described, without departing from the spirit and full intended scope of the invention, as defined by the appended claims.

I claim as my invention:

1. The herein described method of salvaging adhering egg materials from a broken egg shell which consists in disposing the shell upon a support therefor with the interior surface of the shell in substantially evenly spaced relation to the support, and while on said support, projecting a plurality of streams of air under pressure, at spaced locations adjacent one end of, and substantially within the shell, in causing the air to traverse substantially the entire inner surface of the broken shell and in wiping the egg material from the inside of the shell by causing movement of the egg material, under influence of said air streams, toward the margin of the broken shell.

2. In a device for clearing an egg shell portion of its adhering contents by fluid under pressure, a head member of substantially parabolic section, constituting a nozzle, and a curved member carried by the head member, and adapted to position the egg shell portion under treatment, in spaced relation from the surface of the head member.

3. In a device for clearing an egg shell portion of adhering egg materials, a conduit adapted to supply air under pressure, a receptacle carried by said conduit, a partly ovoid head portion carried by said conduit, said head portion having a passage therein, air openings extending in spaced relation from said passage to the exterior of said head portion, a valve member disposed in said passage and adapted to control the flow of air through said head portion, a control element extending from said valve beyond the outer surface of said head portion and adapted for movement toward said head portion upon application of an egg shell thereto, the extending portion of said control member being arranged to space the egg shell appreciably from said head portion and adapted upon actuation, to permit passage of air substantially over the inside surface of the egg portion under treatment, said receptacle being disposed below said head portion and arranged to receive the discharged contents of the egg shell.

4. The herein described method of clearing an egg shell of its contents, which consists in breaking the shell into substantially equal portions, discharging the greater part of the egg materials from the broken shell portions and in introducing a stream of fluid under pressure substantially within the several broken shell portions, shaping the stream to conform substantially to the shell portion causing the fluid stream to skirt the interior surface of the shell portion under treatment, in confining the stream to a path lying closely along the interior surface of the shell portion and thereby expelling the adhering egg materials therefrom.

5. The herein described method of relieving egg shells of adhering contents which consists in applying a half shell over a nozzle member, spraying a fluid, as a stream under pressure through the nozzle member, upon the interior surface of the shell and in directing and shaping said stream in hollow form, closely along the shell, thereby causing said fluid to traverse, substantially uniformly, such surface.

6. A device for clearing an egg shell portion of adhering egg materials consisting of a conduit and passages for introducing a stream of air under pressure substantially over the entire interior surface of the shell portion under treatment, and means coacting with the shell portion to shape said stream into hollow, partly ovoid form and substantially uniform thickness, said means including a member to be disposed interiorly by the shell portion, conforming in shape thereto, and means on said member for spacing the shell therefrom.

JAMES ASA LAFFLER.